US012002117B1

(12) United States Patent
Paczkowski et al.

(10) Patent No.: US 12,002,117 B1
(45) Date of Patent: Jun. 4, 2024

(54) ADVANCED METERING WITH DISTRIBUTED LEDGER CONTROL

(71) Applicant: T-Mobile Innovations LLC, Overland Park, KS (US)

(72) Inventors: Lyle Walter Paczkowski, Mission Hills, KS (US); Ivo Rook, New York, NY (US); John Melvin Meyer, Jr., Lenexa, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 786 days.

(21) Appl. No.: 16/299,833

(22) Filed: Mar. 12, 2019

(51) Int. Cl.
*G06Q 50/06* (2012.01)
*H04L 9/06* (2006.01)
*H04L 41/342* (2022.01)
*H04L 9/00* (2022.01)

(52) U.S. Cl.
CPC .......... *G06Q 50/06* (2013.01); *H04L 9/0637* (2013.01); *H04L 41/342* (2022.05); *G06Q 2220/00* (2013.01); *H04L 9/50* (2022.05)

(58) Field of Classification Search
CPC .. G06Q 50/06; G06Q 2220/00; H04L 9/0637; H04L 2209/38; H04L 9/50; H04L 41/342
See application file for complete search history.

(56) References Cited

U.S. PATENT DOCUMENTS 7,236,950 B2 6/2007 Savage et al.
7,400,904 B2 7/2008 Cornwall et al.
8,140,279 B2 3/2012 Subbloie
(Continued)

FOREIGN PATENT DOCUMENTS

WO 2017066002 A1 4/2017
WO WO-2018127019 A1 * 7/2018
(Continued)

OTHER PUBLICATIONS

Kristiina Valtanen, Creating Value Through Blockchain Powered Resource Configurations: Analysis of 5G Network Slice Brokering Case, IEEE, 2018, obtained from https://ieeexplore.ieee.org/stamp/stamp.jsp?tp=&arnumber=8368983 (Year: 2018).*

*Primary Examiner* — Neha Patel
*Assistant Examiner* — Chunling Ding (57) ABSTRACT

In a resource-metering data network, slice control circuitry instantiates a wireless network slice that comprises hardware-trust circuitry, ledger-client circuitry, distributed-ledger circuitry, and resource-meter circuitry. The hardware-trust circuitry establishes hardware-trust with the ledger-client circuitry, the distributed-ledger circuitry, and the resource-meter circuitry. The resource-meter circuitry measures resource-usage and wirelessly transfer meter data characterizing the resource-usage. The ledger-client circuitry receives the meter data from the resource-metering circuitry and transfers the meter data to the distributed-ledger circuitry. The distributed-ledger circuitry executes distributed ledger transactions with the meter data, generates resource-usage results, and commits the meter data and the resource-usage results to different distributed ledgers in a blockchain format. Ledger client circuitry transfers the resource-usage results from the different distributed ledgers to network addresses.

20 Claims, 6 Drawing Sheets

(56) References Cited

U.S. PATENT DOCUMENTS

| | | | |
|---|---|---|---|
| 10,192,198 B2 | 1/2019 | Nazzari et al. | |
| 10,361,843 B1* | 7/2019 | Suthar | H04L 9/3257 |
| 10,419,908 B1* | 9/2019 | Hutz | H04W 60/00 |
| 2011/0095903 A1* | 4/2011 | Gudlavenkatasiva | G01D 4/004 |
| | | | 705/26.25 |
| 2011/0152970 A1* | 6/2011 | Jollota | H04L 67/12 |
| | | | 342/357.55 |
| 2013/0057367 A1 | 3/2013 | Smith | |
| 2016/0132975 A1* | 5/2016 | Liao | G06Q 30/0202 |
| | | | 705/7.31 |
| 2016/0203569 A1 | 7/2016 | Forbes, Jr. et al. | |
| 2016/0212620 A1* | 7/2016 | Paczkowski | H04L 9/32 |
| 2017/0017955 A1 | 1/2017 | Stern et al. | |
| 2017/0086118 A1* | 3/2017 | Vrzic | H04W 36/0011 |
| 2017/0141973 A1* | 5/2017 | Vrzic | H04W 76/11 |
| 2017/0243193 A1 | 8/2017 | Manian et al. | |
| 2017/0279774 A1 | 9/2017 | Booz et al. | |
| 2018/0288179 A1* | 10/2018 | Bhatia | H04L 69/08 |
| 2018/0310169 A1* | 10/2018 | Wang | H04L 61/5007 |
| 2019/0373472 A1* | 12/2019 | Smith | H04W 4/70 |
| 2019/0379664 A1* | 12/2019 | Suthar | H04L 9/3239 |
| 2020/0034454 A1* | 1/2020 | Chamarajnager | H04L 9/0637 |
| 2020/0045548 A1* | 2/2020 | Dowlatkhah | H04N 21/234 |
| 2020/0187071 A1* | 6/2020 | Chen | H04W 72/543 |
| 2020/0220791 A1* | 7/2020 | Aiello | G06F 9/455 |
| 2020/0228316 A1* | 7/2020 | Cahill | H04L 9/0637 |
| 2021/0247426 A1* | 8/2021 | Liu | G06Q 30/0645 |

FOREIGN PATENT DOCUMENTS

| | | | | |
|---|---|---|---|---|
| WO | WO-2019100242 A1 * | 5/2019 | | H04W 72/00 |
| WO | WO-2019120076 A1 * | 6/2019 | | H04L 29/06 |
| WO | WO-2019149016 A1 * | 8/2019 | | H04L 41/0893 |
| WO | WO-2019179301 A1 * | 9/2019 | | G06F 9/45558 |

* cited by examiner

ADVANCED METERING WITH DISTRIBUTED LEDGER CONTROL

TECHNICAL BACKGROUND

The consumption of resources like water and electricity is measured my resource meters. The resource meters report the measured resource usage, and the reported resource usage is converted into monetary charges to the resource consumer. Resource meters have become fairly complex and communicate with various entities over data networks. In some cases, the resource meters communicate over wireless communication networks with billing servers.

The wireless communication networks deploy Network Function Virtualization Infrastructures (NFVIs) that execute Virtual Network Functions (VNFs) to serve the user communication devices. The NFVIs are computer systems with virtualization software. The VNFs are network elements like data routers, network controllers, and authorization databases. A wireless communication network is able to quickly launch a set of VNFs in the NFVIs, and the NFVI/NFV combination is called a wireless network slice.

A distributed ledger comprises a computer network of distributed ledger nodes. The distributed ledger nodes each maintain a copy of ledger data in a blockchain database format. The blockchain database format stores a hash of the previous data block in the current data block. These hashes and a high number of ledger nodes make the ledger data virtually immutable. The ledger nodes have endorser nodes that receive proposed ledger transactions. The endorser nodes process chain code to execute test transactions based on the proposals and may endorse test transactions per ledger endorsement rules. When a ledger transaction is endorsed, ledger orderer nodes distribute the endorsed ledger transaction to peer nodes per orderer rules. The peer nodes process the chain code to execute the endorsed ledger transaction. The peer ledger nodes may reach consensus on the executed ledger transaction, and when peer consensus is formed for the ledger transaction, the peer ledger nodes commit the ledger transaction to the immutable blockchain database and transfer chain code output.

Unfortunately, current wireless communication networks do not efficiently and effectively integrate resource meters and distributed ledgers into their wireless network slices.

TECHNICAL OVERVIEW

In a resource-metering data network, slice control circuitry instantiates a wireless network slice that comprises hardware-trust circuitry, ledger-client circuitry, distributed-ledger circuitry, and resource-meter circuitry. The hardware-trust circuitry establishes hardware-trust with the ledger-client circuitry, the distributed-ledger circuitry, and the resource-meter circuitry. The resource-meter circuitry measures resource-usage and wirelessly transfer meter data characterizing the resource-usage. The ledger-client circuitry receives the meter data from the resource-metering circuitry and transfers the meter data to the distributed-ledger circuitry. The distributed-ledger circuitry executes distributed ledger transactions with the meter data, and in response, generates resource-usage results and commits the meter data and the resource-usage results to different distributed ledgers in a blockchain format. The ledger client circuitry transfers the resource-usage results from the different distributed ledgers to network addresses.

DETAILED DESCRIPTION

Figure 1:
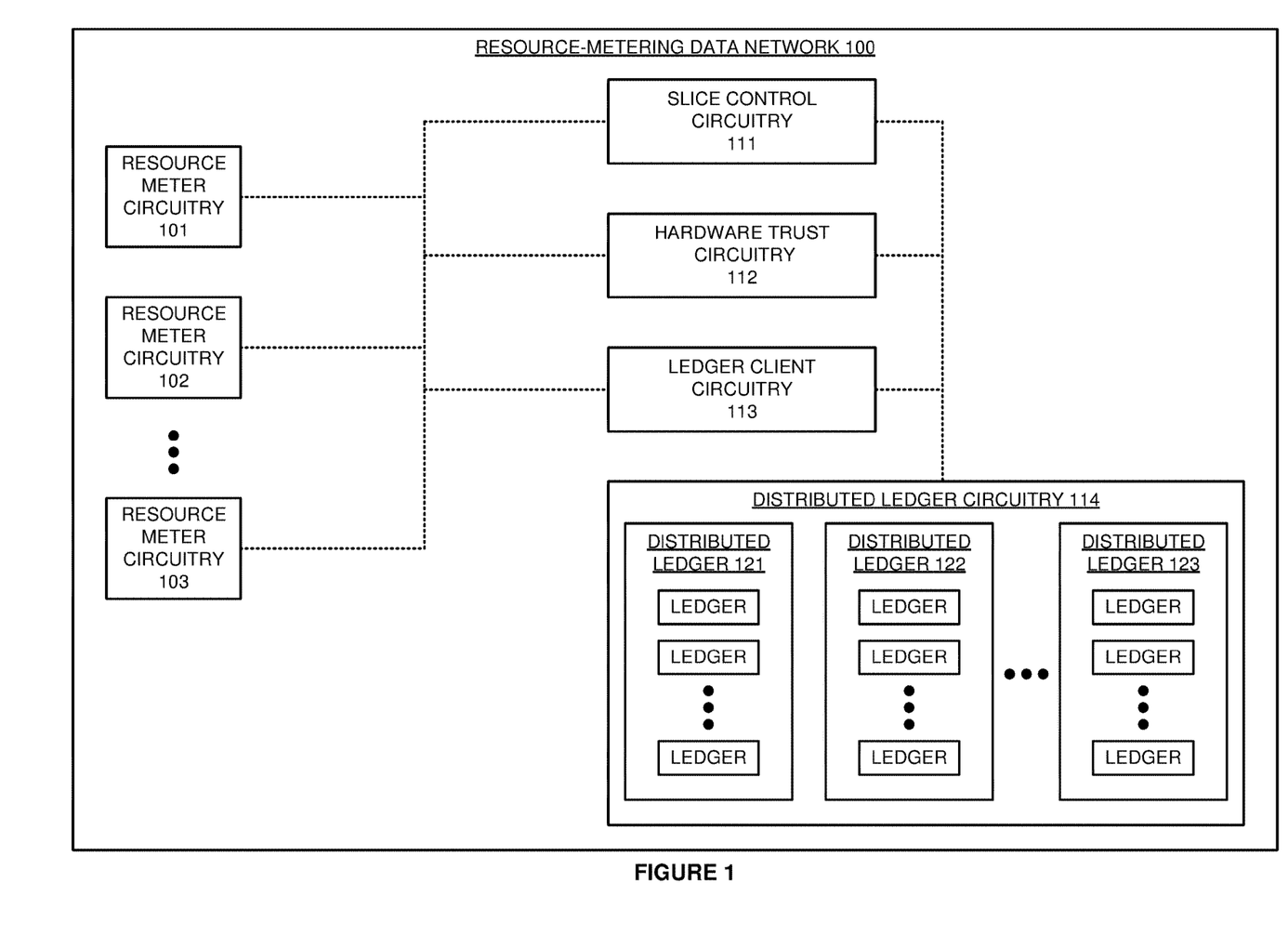
FIG. 1 illustrates a resource-metering data network that performs advanced metering under distributed ledger control.

FIG. 1 illustrates resource-metering data network 100 that performs advanced metering under distributed ledger control. Resource-metering data network 100 comprises resource-metering circuitry 101-103, slice-control circuitry 111, hardware-trust circuitry 112, ledger-client circuitry 113, and distributed-ledger circuitry 114. Distributed-ledger circuitry 114 comprises distributed ledgers 121-123. Resource-metering data network 100 has been simplified for clarity and includes more resource-metering circuitry and more distributed ledger circuitry than the amount shown.

Resource-meter circuitry 101-103 could be sensors, controllers, computers, and/or the like. Resource-meter circuitry 101-103 comprises communication circuitry and metering circuitry. The communication circuitry comprises antennas, modulators, analog/digital interfaces, processing circuitry, memory circuitry, and bus circuitry. In the communication circuitry, the processing circuitry executes software that is stored in the memory circuitry and that includes an operating system and applications for networking, hardware-trust, and ledger communications. The metering circuitry comprises processing circuitry, memory circuitry, and bus circuitry. In the metering circuitry, the processing circuitry executes software that is stored in the memory circuitry and that includes an operating system and metering application. Resource-metering circuitry 101-103 includes hardware-trust codes that are physically embedded in read-only memories.

Circuitry 111-114 comprises a network of computers having communication circuitry, processing circuitry, memory circuitry, and bus circuitry. In circuitry 111-114, the processing circuitry executes software that is stored in the memory circuitry. The software includes operating systems and applications for networking, hardware-trust, ledger-client, and distributed ledgers. Ledger circuitry 113-114 includes hardware-trust codes that are physically embedded in read-only memories. In some examples, circuitry 112-114 comprises a wireless network slice that is served by multiple Network Function Virtualization Infrastructures (NFVIs).

Resource-meter circuitry 101-103 is coupled to circuitry 111-113 over data links that are at least partially wireless and may be partially wireline. Circuitry 111-114 is coupled together over data links that are typically wireline although wireless links may be used. Exemplary wireless communication protocols include Institute of Electrical and Electronic Engineers (IEEE) 802.11 (WIFI), Fifth Generation New Radio (5GNR), Long Term Evolution (LTE), and/or the like. Exemplary wireline communication protocols include Time Division Multiplex (TDM), IEEE 802.3 (Ethernet), Internet Protocol (IP), Data Over Cable System Interface Specification (DOCSIS), Wave Division Multiplexing (WDM), and/or the like.

Distributed ledger 121 comprises geographically-diverse nodes of distributed ledger circuitry 114. Each of the geographically-diverse nodes maintains a ledger for distributed ledger 121. Distributed ledgers 122-123 are configured in a like manner. Distributed ledgers 121-123 use a blockchain database format that comprises data blocks where the newest data block stores a hash of the previous data block. These hashes and a high number of ledger nodes make the ledger data virtually immutable. Distributed ledgers 121-123 have endorser nodes that receive proposed ledger transactions from ledger-client circuitry 113. The endorser nodes process chain code to execute test transactions based on the proposals and may endorse the test transactions per ledger endorsement rules. When a ledger transaction is endorsed, ledger orderer nodes distribute the endorsed ledger transaction to peer nodes per orderer distribution rules. The peer nodes process the chain code to execute the endorsed ledger transaction. When the peer nodes reach consensus on the executed ledger transaction, the peer nodes commit the ledger transaction to their immutable blockchain database and transfer chain code output.

In operation, slice control circuitry 111 instantiates a wireless network slice that comprises resource-meter circuitry 101-103, hardware-trust circuitry 112, ledger-client circuitry 113, and distributed-ledger circuitry 114. To instantiate the wireless network slice, slice-control circuitry 111 transfers instructions to computer systems to execute software packages per quality metrics. In some examples, the wireless network slice comprises Network Function Virtualization Infrastructures (NFVIs) that execute Virtual Network Functions (VNFs) under Management and Orchestration (MANO) control.

Slice control circuitry 111 directs a wireless network computer to transfer slice configuration data for wireless delivery to resource-meter circuitry 101-103. The slice configuration data comprises contact information for hardware-trust circuitry 112 and ledger-client circuitry 113 and metering applications or updates. Resource-meter circuitry 101-103 initiates hardware-trust communications using the contact information for hardware-trust circuitry 112. Resource-meter circuitry 101-103 transfers meter data using the contact information for ledger-client circuitry 113.

Hardware-trust circuitry 112 establishes hardware-trust with resource-meter circuitry 101-103, ledger-client circuitry 113, and distributed-ledger circuitry 114. To establish hardware-trust with ledger-client circuitry 113, hardware-trust circuitry 112 transfers random numbers to ledger-client circuitry 113. Ledger-client circuitry 113 hashes the random numbers with its read-only hardware-trust code to generate hardware-trust results. Ledger-client circuitry 113 transfers the hardware-trust results to hardware-trust circuitry 112.

Hardware-trust circuitry 112 hashes the random numbers with a copy of the read-only hardware-trust code to generate the hardware-trust results. Hardware-trust is established when the results match. The process is repeated or performed on demand to maintain hardware-trust. Hardware-trust circuitry 112 transfers a hardware-trust digital certificate to ledger-client circuitry 113 when hardware-trust is established. Ledger-client circuitry 113 transfers the hardware-trust digital certificate to other systems that can verify hardware-trust by decrypting the hardware-trust digital certificate with a public key for hardware-trust circuitry 112. Hardware-trust circuitry 112 establishes hardware-trust with resource-meter circuitry 101-103 and distributed-ledger circuitry 114 in a similar manner.

Resource-meter circuitry 101-103 and ledger client circuitry 113 will not interact if one fails hardware-trust. Resource-meter circuitry 101-103 and ledger client circuitry 113 may exchange digital certificates or query hardware-trust circuitry 112 to verify hardware-trust. Ledger client circuitry 113 and distributed ledger circuitry 114 will not interact if one fails hardware-trust. Ledger client circuitry 113 and distributed ledger circuitry 114 may exchange digital certificates or query hardware-trust circuitry 112 to verify hardware-trust.

Resource-meter circuitry 101-103 measures resource-usage like fluid flow, electricity usage, data transfers, and/or the like. Resource-meter circuitry 101-103 wirelessly transfers data characterizing the resource-usage for delivery to ledger-client circuitry 113. Ledger-client circuitry 113 transfers the meter data to distributed-ledger circuitry 114. In distributed-ledger circuitry 114, distributed ledgers 121-123 execute distributed ledger transactions with the meter data and responsively generate resource-usage results. Distributed ledgers 121-123 commit the meter data and the resource-usage results to different ledgers in a blockchain format.

Distributed ledgers 121-123 transfer the resource-usage results to ledger client circuitry 113. Ledger client circuitry 113 transfers the resource-usage results for delivery to network addresses per a distribution list for the wireless network slice. For example, ledger client circuitry 113 may email an accounting statement to a resource user. In some examples, ledger client circuitry 113 reads from the top blocks of different distributed ledgers 121-123 to receive the resource-usage results.

Distributed-ledger circuitry 114 may implement side distributed ledgers in response to executing the distributed ledger transactions with the meter data. For example, distributed ledger 121 executes chain code to process meter data from multiple ledgers to generate results like the resource-usage results and a side-chain result. In response to the side-chain result, distributed ledger 121 initiates a new distributed ledger with an initial distributed ledger block. The new distributed ledger is executed by distributed ledger circuitry 114 and operates as described for ledgers 121-124. For example, the meter data may indicate a new fluid flow measurement like viscosity. In response to the new viscosity measurements, distributed ledger 121 is configured to initiate a new distributed ledger with a foundry ledger block. The new distributed ledger is then executed by distributed ledger circuitry 114 and operates as described for distributed ledgers 121-123.

In some examples, ledger-client circuitry 113 receives user activity data like a monetary transfer, service request, or the like. Ledger-client circuitry 113 transfers the user activity data to distributed-ledger circuitry 114. In distributed-ledger circuitry 114, distributed ledgers 121-123 execute distributed ledger transactions with the user activity data to generate user account results. Distributed ledgers 121-123 commit the user activity data and the user account result to distributed ledger memory in the blockchain format. Distributed ledgers 121-123 may then execute the distributed ledger transactions with both the meter data and the user account results to generate the resource-usage results. For example, distributed ledger 121 may execute a distributed ledger transaction with an electricity consumption amount, electricity generation amount, and a monetary payment to generate the an electric utility accounting statement for the electricity consumption.

Advantageously, resource-metering data network 100 efficiently and effectively integrates distributed ledgers 121-123 and resource metering circuitry 101-103 into a wireless network slice.

Figure 2:
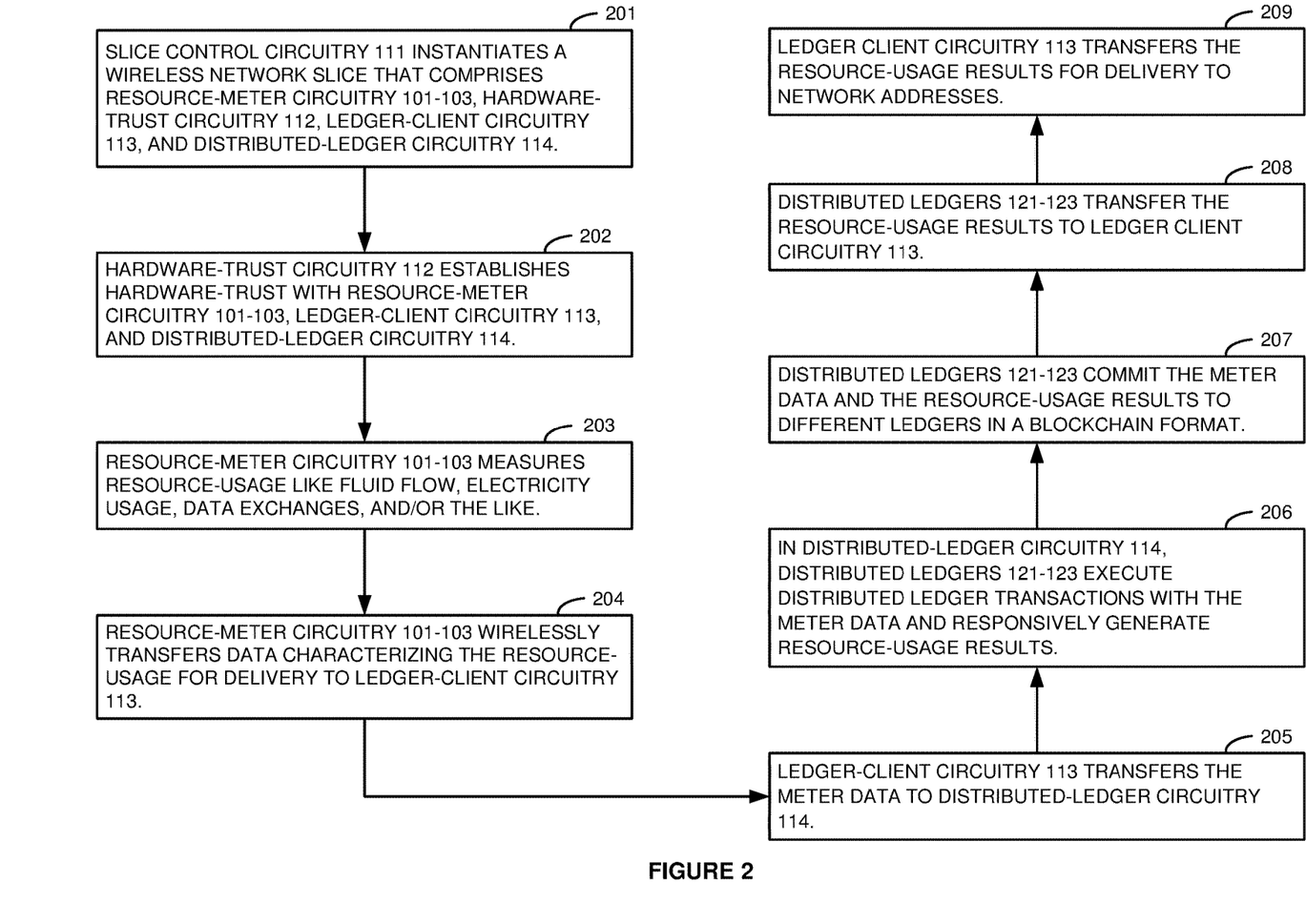
FIG. 2 illustrates the operation of the resource-metering data network to perform advanced metering under distributed ledger control.

FIG. 2 illustrates the operation of resource-metering data network 100 to perform advanced metering under distributed ledger control. Slice control circuitry 111 instantiates a wireless network slice that comprises resource-meter circuitry 101-103, hardware-trust circuitry 112, ledger-client circuitry 113, and distributed-ledger circuitry 114 (201). Hardware-trust circuitry 112 establishes hardware-trust with resource-meter circuitry 101-103, ledger-client circuitry 113, and distributed-ledger circuitry 114 (202). Resource-meter circuitry 101-103 measures resource-usage like fluid flow, electricity usage, data exchanges, and/or the like (203). Resource-meter circuitry 101-103 wirelessly transfers data characterizing the resource-usage for delivery to ledger-client circuitry 113 (204). Ledger-client circuitry 113 transfers the meter data to distributed-ledger circuitry 114 (205). In distributed-ledger circuitry 114, distributed ledgers 121-123 execute distributed ledger transactions with the meter data and responsively generate resource-usage results (206). Distributed ledgers 121-123 commit the meter data and the resource-usage results to different ledgers in a blockchain format (207). Distributed ledgers 121-123 transfer the resource-usage results to ledger client circuitry 113 (208). Ledger client circuitry 113 transfers the resource-usage results for delivery to network addresses per a distribution list for the network slice (209).

Figure 3:
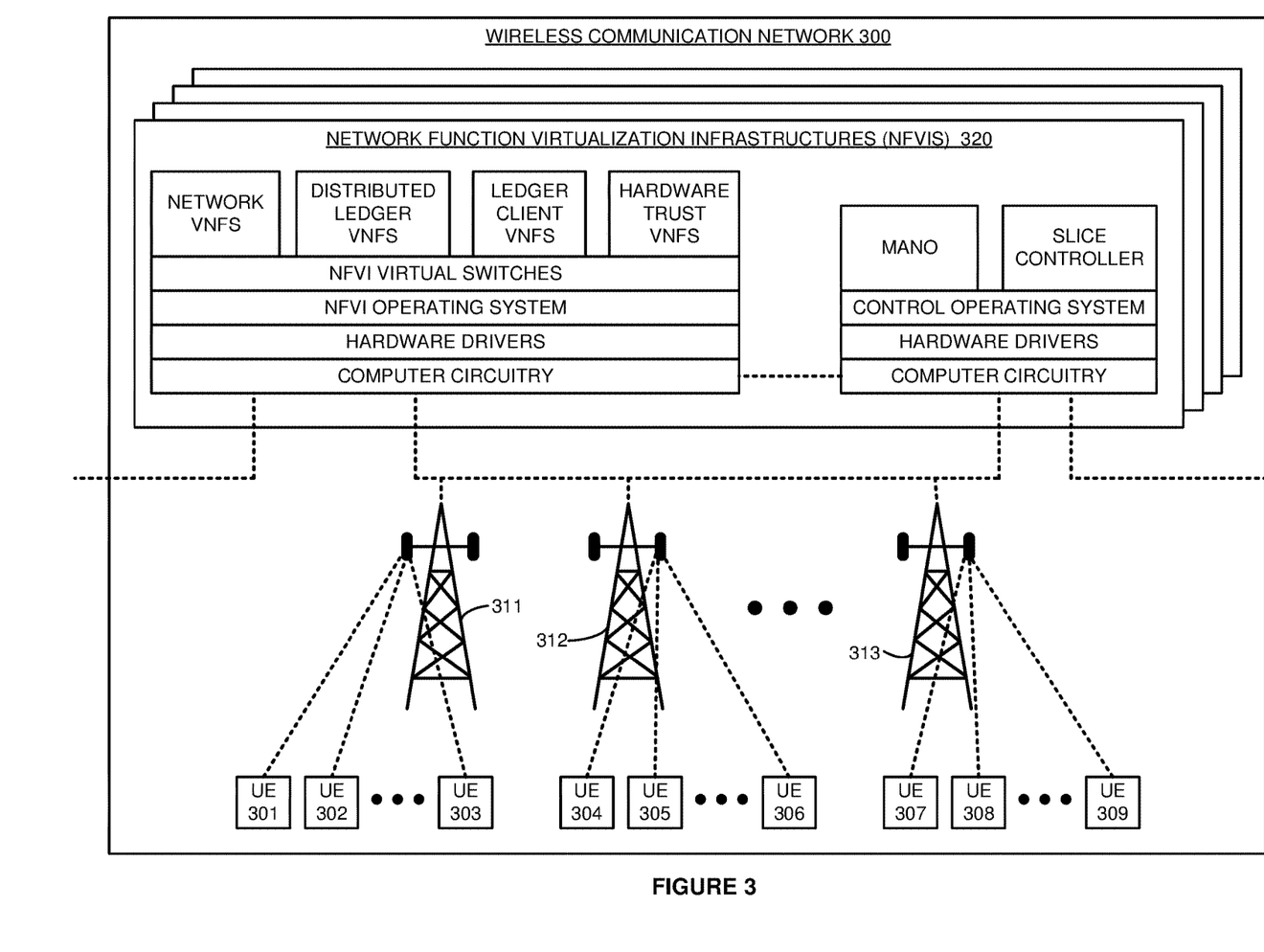
FIG. 3 illustrates wireless communication network that performs advanced metering under distributed ledger control.

FIG. 3 illustrates wireless communication network 300 to perform advanced metering under distributed ledger control. Wireless communication network 300 is an example of resource-metering data communication system 100 although communication system 100 could differ. Wireless communication network 300 comprises (User Equipment) UEs 301-309, Radio Access Networks (RANs) 311-313, and NFVIs 320. NFVIs 320 each comprise computer circuitry and software. The software comprises hardware drivers, operating systems, virtual switches, slice controller, Management and Orchestration (MANO), and Virtual Network Functions (VNFs) for networking, distributed ledgers, ledger clients, and hardware-trust. UEs 301-309 transfer meter data to RANs 311-313 over wireless data links. RANs 311-313 transfer the meter data to NFVIs 320 over data links. Wireless communication network 300 has been simplified for clarity and typically includes many more UEs, RANs, and NFVIs than the amount shown.

UEs 301-309 comprise radio circuitry and control circuitry. The radio circuitry comprises antennas, modulators, amplifiers, filters, digital/analog interfaces, processing circuitry, memory circuitry, firmware/software, and bus circuitry. The control circuitry comprises processing circuitry, memory circuitry, bus circuitry, and software. The software is stored in the memory circuitry and includes operating system, network applications, and meter applications. In UEs 301-309, the processing circuitry executes operating systems, network applications, and meter applications to transfer meter data to RANs 311-313.

RANs 311-313 comprise wireless access points and backhaul circuitry. The wireless access points include LTE eNodeBs, 5GNR gNodeBs, WIFI access points, and/or the like. The backhaul circuitry comprises TDM, Ethernet, IP, DOCSIS, WDM, LTE, 5GNR, WIFI, and/or the like. The wireless access points comprise radio circuitry and baseband circuitry. The radio circuitry comprises antennas, modulators, amplifiers, filters, digital/analog interfaces, processing circuitry, memory circuitry, firmware/software, and bus circuitry. The baseband circuitry comprises processing circuitry, memory circuitry, bus circuitry, and software. The software is stored in the memory circuitry and includes an operating system and network applications. In RANs 311-313, the processing circuitry executes the operating system and network applications to transfer the meter data from UEs 301-309 to NFVIs 320.

NFVIs 320 comprise computer circuitry and software. The computer circuitry comprises Central Processing Units (CPUs), Graphics Processing Units (GPUs), and/or Application Specific Integrated Circuits (ASICs). The computer circuitry comprises memory circuitry like Random Access Memory (RAM), flash drives, and/or disc drives. The computer circuitry comprises transceiver circuitry like Network Interface Cards (NICs), networking System-On-Chip (SOC), and/or bus interfaces. The computer circuitry includes bus circuitry to interconnect the processing circuitry, memory circuitry, and transceiver circuitry. The software is stored in the memory circuitry and is executed in the processing circuitry.

The hardware drivers communicate with hardware components like CPUs, RAM, flash dives, bus interfaces, NICs, and the like The NFVI operating system and the control operating system communicate with the various hardware drivers. The NFVI operating system may include hypervisors, NFV control agents, and the like. The NFVI virtual switches couple the VNFs and interface the VNFs to the NFVI operating system. The slice controller directs the creation, modification, and termination of network slices by signaling the MANO, RANs 311-313, and UEs 301-309. The MANO includes an orchestrator, Virtual Infrastructure Manager (VIM), and VNF Manager (VNFM) to control the execution of VNFs in NFVIs 320. The hardware-trust VNFs establish and maintain hardware-trust in UEs and VNFs. The ledger client VNFs exchange meter configuration data between UEs 301-309 and the distributed ledger VNFs. The distributed ledger VNFs endorse meter transactions, execute meter transactions, store meter data and transaction results in immutable block chains, and transfer outputs including meter configuration data, accounting statements, and the like.

The network VNFs comprise User Plane Function (UPF), Access and Mobility Management Function (AMF), Session Management Function (SMF), Authentication Server Function (AUSF), Policy Control Function (PCF), Unified Data Management (UDM), Application Function (AF), Network Repository Function (NRF), Network Slice Selection Function (NSSF), Network Exposure Function (NEF), Mobility Management Entity (MME), Home Subscriber System (HSS), Serving Gateway (S-GW), Packet Data Network Gateway (P-GW), Policy Control Rules Function (PCRF), and typically other network functions. The UPF routes data packets and forms an anchor point for user mobility. The UPF inspects packets and applies Quality-of-Service (QoS) and policies. The AMF terminates N2 signaling and N1 mobility signaling. The AMF manages ciphering, security, authentication, registration, connections, mobility, and policy enforcement. The SMF terminates N1 session signaling and manages session establishment, modification, and release. The SMF allocates network addresses, controls RAN Quality-of-Service (QoS) and policies, handles downlink notifications, UPF control, and traffic steering. The AUSF serves user authentication through the UDM. The UDM generates user authentication credentials, identifies users, authorizes access, and manages user subscriptions. The PCF provides policy rules for network slices, roamers, and mobility. The AF routes traffic and implements policy controls. The NRF handles network function discovery and controls function profiles and instances. The NSSF selects network slices, assistance information, and AMFs for users. The NEF exposes capabilities and events and securely interacts with external applications to provision network functions. The MME manages session establishment, modification, and release. The MME also manages authentication, authorization, mobility, Non-Access Stratum signaling, ciphering, registration, and security. The HSS authenticates and authorizes users and indicates user services. The HSS also generates user authentication credentials and supports user identification and authorization. The S-GW serves wireless access points, routes data packets, and applies QoS. The P-GW routes data packets, handles network addressing, forms user mobility anchor points, inspects packets, and applies QoS. The PCRF provides policy rules and decisions.

In NFVIs 320, the slice controllers direct the MANOs to launch a wireless network slice based on NFVI Service Descriptors (SDs) and Forwarding Graphs (FGs). The wireless network slice comprises the network VNFs, ledger client VNFs, distributed ledger VNFs, and hardware trust VNFs. The VNFs are configured with databases and software to perform as follows when executed. The MANOs directs the NFVI operating systems to execute the VNFs and virtual switches per the NFVI SDs and FGs. The NFVI operating systems execute the VNFs and NFVI virtual switches per the NFVI SDs and FGs. The slice controllers direct the NEFs or some other function to provision UEs 301-309 and RANs 311-313 for the metering service. For example, the NEFs may download a hardware-trust application, ledger-client application, and/or metering application to UEs 301-309.

The hardware-trust VNFs establish hardware-trust with UEs 301-309, RANs 311-313, network VNFs, ledger client VNFs, and distributed ledger VNFs. The hardware-trust VNFs transfer random numbers to UEs 301-309, RANS 311-313, and the VNFs. UEs 301-309, RANS 311-313, and the VNFs hash the random numbers with their read-only hardware-trust codes to transfers the hardware-trust results to the hardware-trust VNFs. The hardware-trust VNFs hash the random numbers with copies of the read-only hardware-trust codes to generate the hardware-trust results. The hardware-trust VNFs establish hardware-trust when the results match. The hardware-trust process is repeated or performed on demand to maintain hardware-trust. The hardware-trust VNFs transfer hardware-trust digital certificates to UEs 301-309, RANS 311-313, and the VNFs when hardware-trust is established. UEs 301-309, RANS 311-313, and the VNFs share their hardware-trust digital certificates and verify hardware-trust by decrypting the digital certificates with a public key from the hardware-trusts VNFs. UEs 301-309, RANS 311-313, and the VNFs are configured to stop interactions with an entity that fails hardware-trust.

UEs 301-309 measure resource-usage like fluid flow, electricity usage, data exchanges, or the like. For example, UEs 301-309 measure water use in gallons per day or measure power consumption in watts per hour. UEs 301-309 wirelessly transfer meter data over RANs 311-313 to NFVIs 320. The meter data characterizes the resource-usage and possibly the resource-generation by user, time, amount, location, and the like. In NFVIs 320, the computer circuitry receives the meter data and the hardware drivers notify the NFVI operating system. The NFVI operating system transfers the meter data to the ledger client VNFs over the virtual switches and network VNFs per the network slice FGs. The ledger client VNFs route the meter data to the appropriate distributed-ledger VNFs per the network slice FGs.

The distributed-ledger VNFs execute distributed ledger transactions with the meter data and responsively generate resource-usage results. For example, endorser VNFs receive meter data like watts per hour from the ledger client VNFs per the network slice FGs. The endorser VNFs execute chain code to perform a test transaction with the meter data to generate a test result. If the test result complies with pre-stored endorsement rules, then the endorser VNFs transfer the endorsed transaction to ledger orderer VNFs per the network slice FGs. The orderer VNFs distribute the endorsed transactions to ledger peer VNFs per the network slice FGs. In response to the transaction endorsement, the ledger peer VNFs execute the chain code to process the meter data to generate a resource-metering response like a user ID, service ID, usage amount, and account balance. The ledger peer VNFs reach a consensus on the resource-metering response before committing the meter data and resource-metering response to distributed ledger databases in an immutable blockchain format.

The distributed-ledger VNFs commit the meter data and the resource-usage results to different distributed ledgers in a blockchain format. The distributed-ledger VNFs may launch side ledger VNFs in response to the distributed ledger transactions. For example, distributed-ledger VNFs may commit a resource-metering response that drives one or more the ledger VNFs or client VNFs to request a new distributed ledger from the VNFM in the MANO. The VNFM interacts with the MANO orchestrator and MANO VIM to direct the NFVI operating system to execute new distributed-ledger VNFs per network slice QoS.

The ledger client VNFs read the meter data and the resource-metering responses from the top blocks of the distributed ledger VNFs per the network slice FGs. The ledger client VNFs transfer the resource-metering responses to network addresses per the network slice FGs and external distribution lists. For example, UEs 301-309 may be drones that report their battery power consumption to drive distributed ledger transactions that generate battery alerts. The ledger client VNFs send battery-power alert messages to the drone operator.

The ledger-client VNFs may receive monetary transfer data and transfer the monetary transfer data to the distributed-ledger VNFs. The distributed-ledger VNFs execute distributed ledger transactions with the monetary transfer data to generate user account results. For example, the distributed-ledger VNFs may maintain an account balance for a user based on resource-usage charges, resource-generation credits, and user monetary transfers. The distributed ledger VNFs commit the monetary transfer data and the user account results to the distributed ledger memory in the blockchain format. The distributed ledger VNFs may then execute the distributed ledger transactions with both the meter data and the user account results to generate the resource-usage results. For example, the distributed ledger VNFs may execute a distributed ledger transaction with a data transfer amount and a monetary payment to generate a wireless internet access accounting statement.

Advantageously, wireless communication network 300 efficiently and effectively integrates distributed ledger VNFs and resource-meter UEs 301-309 into a wireless network slice.

Figure 4:
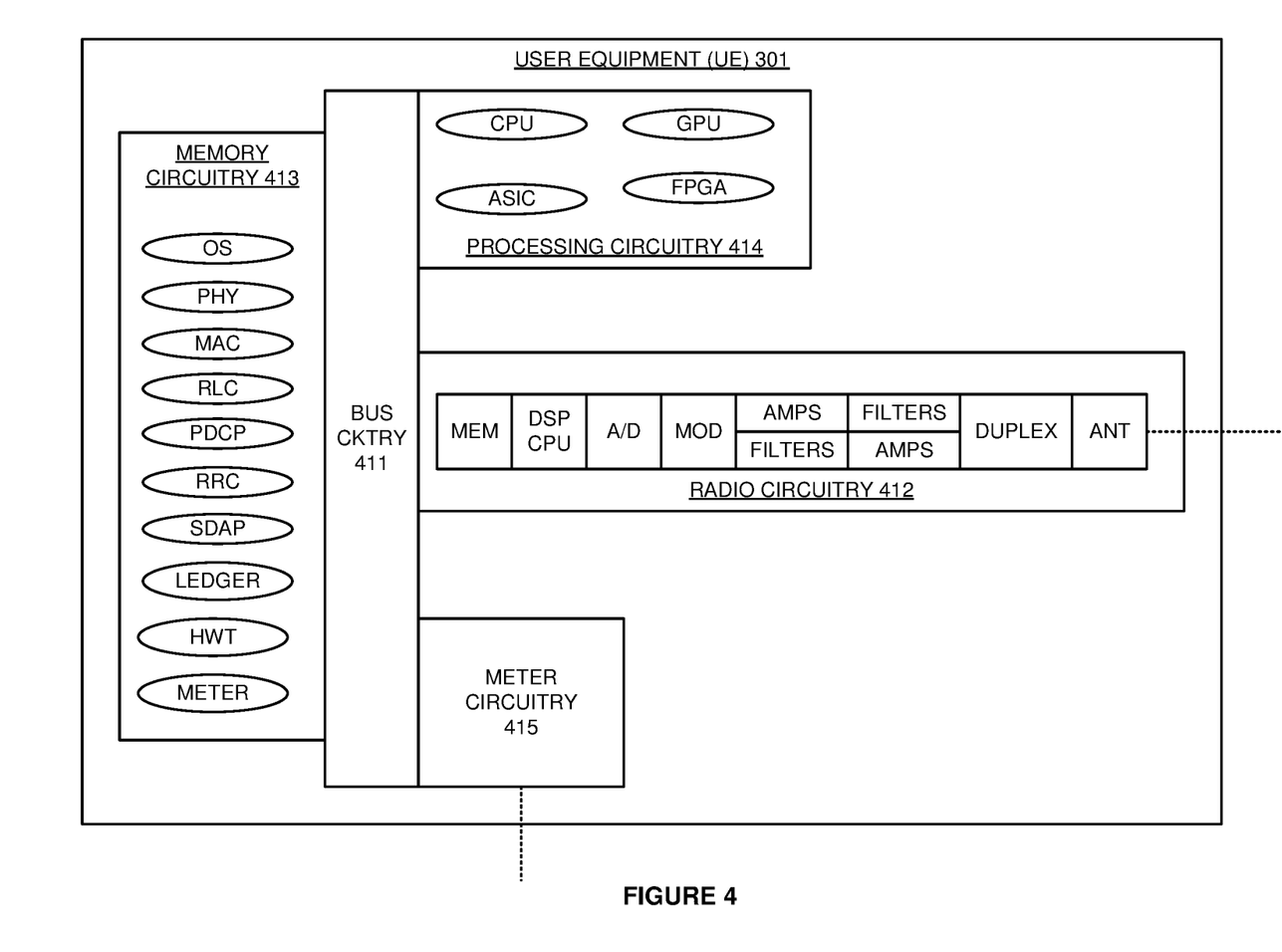
FIG. 4 illustrates wireless User Equipment (UE) for the wireless communication network that performs advanced metering under distributed ledger control.

FIG. 4 illustrates wireless User Equipment (UE) 301 for wireless communication network 300 to perform advanced metering under distributed ledger control. UE 301 is an example of metering circuitry 101-103 and 302-309, although circuitry 101-103 and 302-309 may differ. UE 301 comprises bus circuitry 411, radio circuitry 412, memory circuitry 413, processing circuitry 414, and meter circuitry 415. Bus circuitry 411 couples radio circuitry 412, memory circuitry 413, processing circuitry 414, and meter circuitry 415. Memory circuitry 413 comprises volatile and non-volatile memories like RAM, flash, disc, tape, and the like. Memory circuitry 413 stores an operating system (OS), network applications, meter application, hardware-trust application, and distributed ledger application. The network applications comprise Physical Layer (PHY), Media Access Control (MAC), Radio Link Control (RLC), Packet Data Convergence Protocol (PDCP), Radio Resource Control (RRC), and Service Data Application Protocol (SDAP). Processing circuitry 414 comprises CPUs, GPUs, ASICs, Field Programmable Gate Arrays (FPGAs), and/or some other computer hardware. Processing circuitry 414 executes the operating system, network applications, meter application, hardware-trust application, and distributed ledger application. Meter circuitry 415 comprises flow measurement circuitry, electricity consumption circuitry, data transfer measurement circuitry, and/or some other resource measurement component.

Radio circuitry 412 comprises antennas (ANT), duplexers (DUPLEX), filters, amplifiers (AMPS), modulators (MOD), Analog/Digital interfaces (A/D), Digital Signal Processors (DSP), CPUs, and memory (MEM). The antennas in radio circuitry 412 exchange wireless signals with RANs 311-313. The DSP/CPUs execute firmware/software to drive the exchange of corresponding data signals between the antennas and memory circuitry 413.

The hardware-trust application transfers Uplink (UL) hardware-trust data to the hardware trust VNFs over radio circuitry 412 and RANs 311-313. The meter application generates and stores UL meter data. The ledger client application transfers the UL meter data to the ledger client VNFs over radio circuitry 412 and RANs 311-313. In processing circuitry 414, the network applications process the UL data and transfer UL data and signaling to radio circuitry 412. In radio circuitry 412, the DSP/CPU transfers corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals to the serving RAN.

In radio circuitry 412, the antennas receive wireless Downlink (DL) signals from the serving RAN and transfer corresponding electrical DL signals through the duplexers to the amplifiers. The amplifiers boost the DL signals for filters which attenuate unwanted energy. In modulation, demodulators down-convert the DL signals from their carrier frequencies. The analog/digital interfaces convert the analog DL signals into digital DL signals for the DSP/CPU. The DSP/CPU recovers DL data and signaling from the DL signals and transfers the DL data and signaling to memory circuitry 413. The network applications process the DL data and signaling in memory circuitry 413 to transfer DL hardware-trust data to the hardware-trust application, transfer DL ledger-client data to the ledger-client application. The network applications process the DL data and signaling in memory circuitry 413 to transfer DL configuration data to the metering application.

In the network applications, the PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

The MAC maps between the MAC transport channels and MAC logical channels. MAC functions include buffer status, power headroom, channel quality, Hybrid Automatic Repeat Request (HARQ), user identification, random access, user scheduling, and QoS. The RLC maps between the MAC logical channels and Protocol Data Units (PDUs). RLC functions comprise ARQ, sequence numbering and resequencing, segmentation and resegmentation. The RLC exchanges data and signaling with the PDCP. The PDCP maps between the PDUs from the RLC and Service Data Units (SDUs) for the RRC/SDAP. PDCP functions comprise security ciphering, header compression and decompression, sequence numbering and re-sequencing, de-duplication. The PDCP exchange SDUs with the RRC and SDAP.

The RRC handles SIP messages that encapsulate IP packets that encapsulate SMS messages. The RRC handles UE information like IMSI during RRC attachment. The RRC handles UE on-net authentication. The RRC interacts with wireless network controllers like Access and Mobility Functions (AMFs) and/or Mobility Management Entities (MMEs) to establish and terminate data sessions. The RRC supports N1 and Non-Access Stratum (NAS) messaging with the MMEs/AMFs. The RRC handles security and key management, handover operations, status reporting, QoS, system broadcasts, and network pages. The SDAP exchanges S3 data with UPFs under the control of SMFs. The SDAP maps between the SDUs and the QoS flows and mark the QoS flows with the proper QoS.

In some examples, the OS stored in memory circuitry 413 and executed by processing circuitry 414 has two kernels—a metering kernel and a ledger kernel. The two kernels execute on separate CPU cores or share a core in a time-sliced manner. The metering kernel executes the metering application to direct resource-usage measurement by meter circuitry 415. The ledger kernel executes the ledger-client application to direct the transfer of meter data to the ledger client VNFs. The ledger kernel also executes the hardware-trust application to direct the transfer of hardware-trust data to the hardware-trust VNFs.

Figure 5:
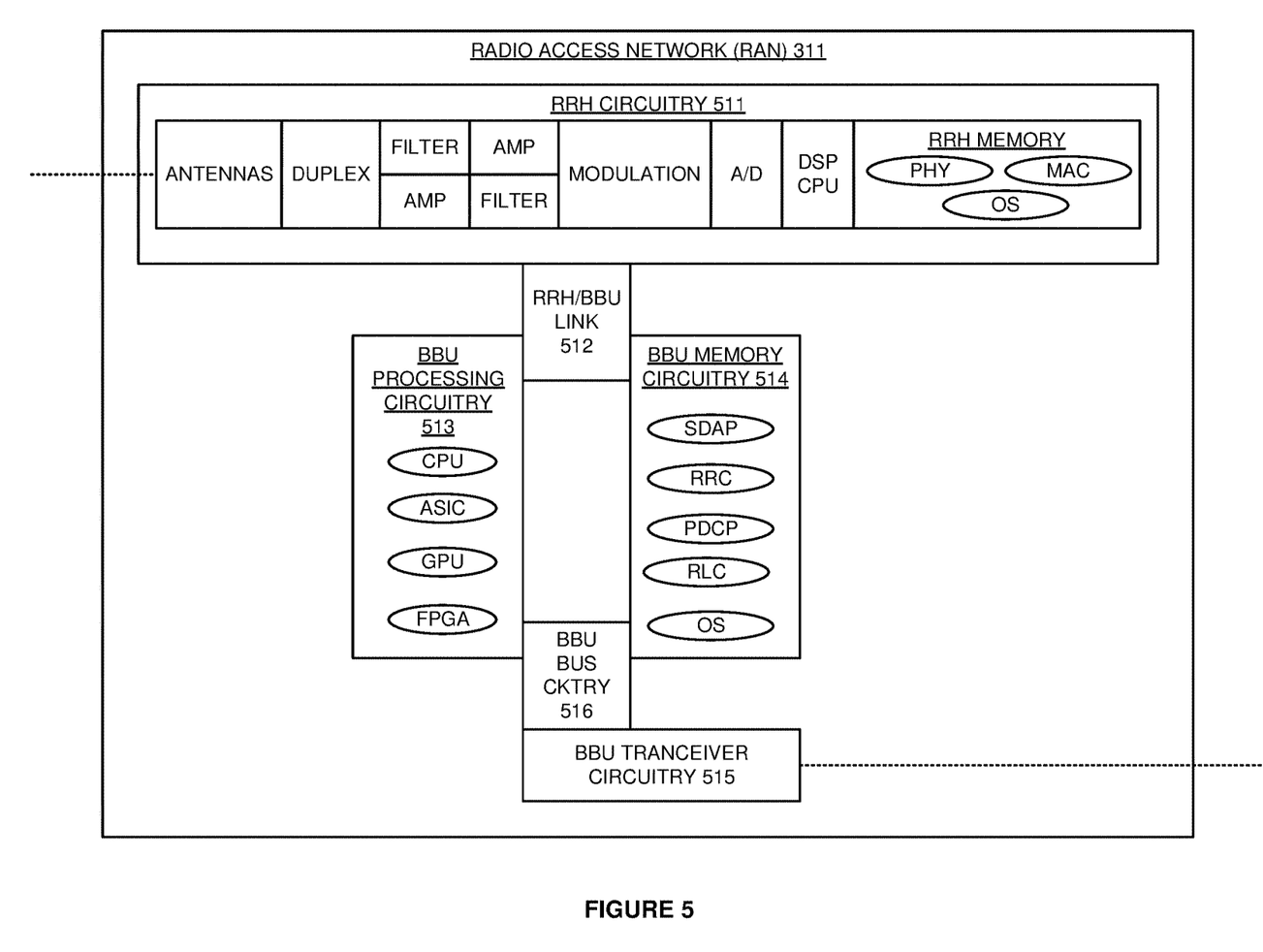
FIG. 5 illustrates a Radio Access Network (RAN) for the wireless communication network that performs advanced metering under distributed ledger control.

FIG. 5 illustrates RAN 311 for wireless communication network 300 to perform advanced metering under distributed ledger control. RAN 311 is an example of communication system 100 data links and RANs 312-313, although these systems may differ. RAN 311 comprises Remote Radio Head (RRH) circuitry 511, RRH/Baseband Unit (BBU) link 512, BBU processing circuitry 513, BBU memory circuitry 514, BBU transceiver circuitry 515, and BBU bus circuitry 516. RRH/BBU link 512 couples RRH circuitry 511 and BBU circuitry 513-514. BBU bus circuitry 516 couples BBU processing circuitry 513, BBU memory circuitry 514, and BBU transceiver circuitry 515. BBU processing circuitry 513 comprises CPUs, GPUs, ASICs, FPGAs, and/or some other computer circuitry. BBU memory circuitry 514 comprises volatile and non-volatile memories like RAM, flash, disc, tape, and the like. BBU memory circuitry 514 stores an operating system and network applications like RLC, PDCP, RRC, and SDAP. BBU processing circuitry 513 executes the operating system and network applications to exchange data and signaling between NFVIs 320 and UEs 301-309.

RRH circuitry 511 comprises antennas, duplexers, filters, amplifiers, modulators, A/D interfaces, DSP/CPU, and memory. The RRH memory stores an operating system and network applications like PHY and MAC. The antennas in RRH circuitry 511 exchange wireless data and signaling with UEs 301-309. The DSP/CPUs execute the operating system and PHY/MAC to drive the exchange of the data and signaling between the antennas and BBU memory circuitry 514.

In RRH circuitry 511, the antennas receive wireless UL signals including hardware-trust data and meter data from UEs 301-303 and transfer corresponding electrical UL signals through the duplexers to the amplifiers. The amplifiers boost the UL signals for filters which attenuate unwanted energy. In modulation, demodulators down-convert the UL signals from their carrier frequencies. The A/D interfaces convert the analog UL signals into digital UL signals for the DSP/CPU. The DSP/CPU recovers UL data and signaling from the UL signals—including the hardware-trust data and meter data. The RRH DSP/CPU transfers the UL data and signaling to BBU memory circuitry 513. In BBU processing circuitry 513, the network applications (RLC/PDCP/RRC/SDAP) process the UL data and signaling to generate additional UL signaling. The network applications forward the UL data and signaling to NFVIs 320 over BBU circuitry 515-516.

BBU transceiver circuitry 515 receives DL data and signaling that includes hardware-trust data and meter configuration data from NFVIs 320 and stores the DL data and signaling in BBU memory circuitry 514. The network applications (RLC, PDCP, RRC, SDAP) process the DL data and signaling in BBU memory circuitry 514 generate additional DL signaling. The network applications forward the DL data and signaling to RRH circuitry 511. In RRH circuitry 511, the DSP/CPU executes the PHY/MAC to transfer corresponding DL signals to the A/D interface. The A/D interface converts the digital DL signals into analog DL signals for the modulators. The modulators up-convert the DL signals to their carrier frequencies. The amplifiers boost the DL signals for the filters which attenuate unwanted out-of-band energy. The filters transfer the DL signals through the duplexers to the antennas. The electrical DL signals drive the antennas to emit corresponding wireless DL signals that include the hardware-trust data and meter configuration data to UEs 301-303.

Figure 6:
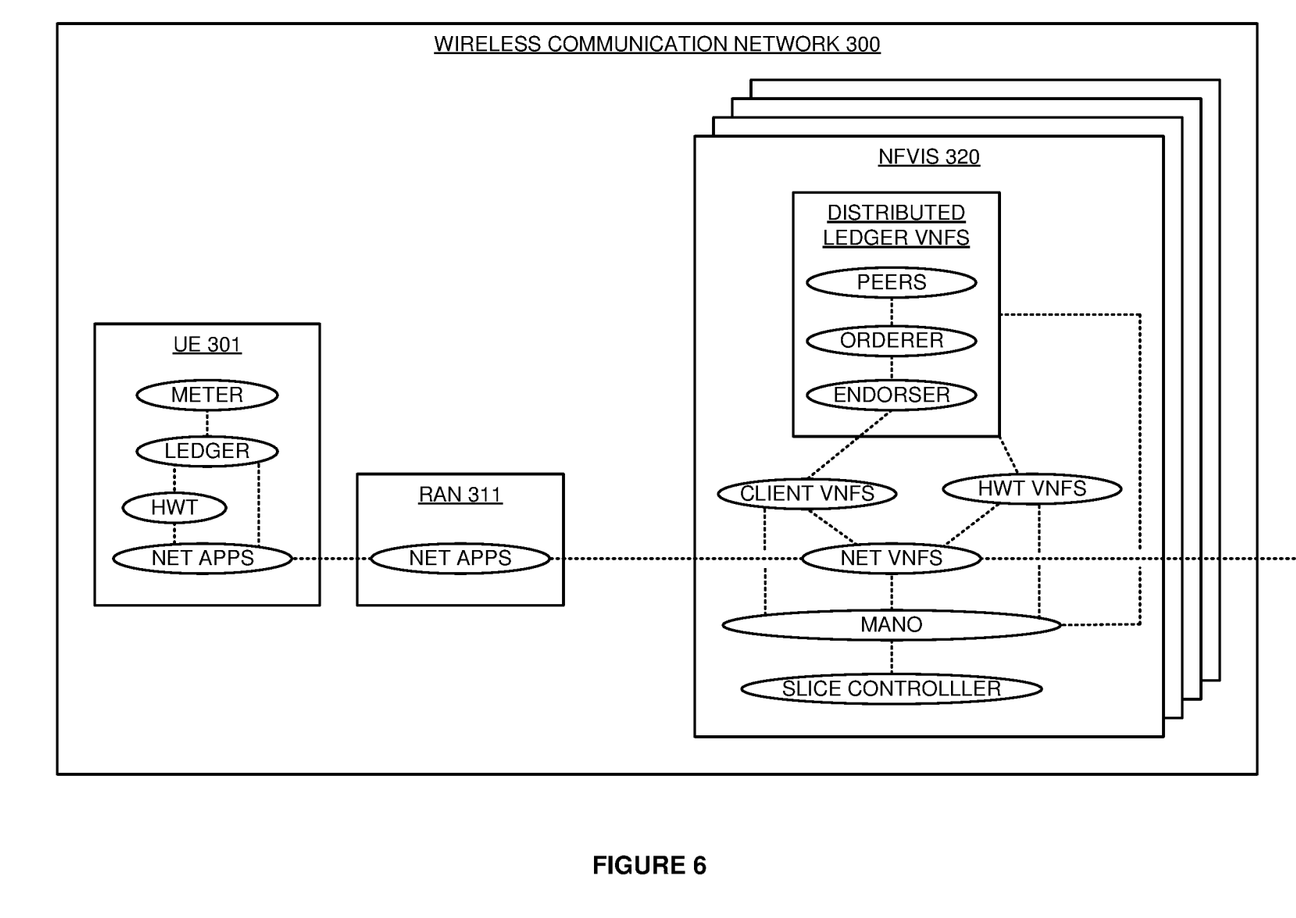
FIG. 6 illustrates a software architecture for the wireless communication network that performs advanced metering under distributed ledger control.

FIG. 6 illustrates a software architecture for wireless communication network 300 that performs advanced metering under distributed ledger control. In NFVIs 320, the slice controllers direct the MANOs to launch the wireless network slice based on NFVI Service Descriptors (SDs) and Forwarding Graphs (FGs). The wireless network slice comprises networking (NET) VNFs, ledger-client VNFs, distributed-ledger VNFs, and hardware-trust (HWT) VNFs. The MANOs directs the NFVI operating systems to execute the VNFs per the NFVI SDs and FGs. The NFVI operating systems execute the VNFs per the NFVI SDs and FGs.

In NFVIs 320, the hardware-trust VNFs establish hardware-trust with the distributed ledger VNFs, ledger client VNFs, and the hardware trust application in UE 301. In UE 301, the metering application measures resource usage and transfers meter data that characterizes the resource-usage to the distributed ledger application. For example, the metering application may measure water usage at a factory in gallons per minute. If the hardware-trust application indicates hardware-trust for the ledger client VNF, then the ledger application transfers the meter data to the ledger client VNFs over the network applications in UE 301, RAN 311, and NFVIs 320. If the ledger client VNFs have hardware-trust with the distributed ledger VNFs, then the ledger-client VNFs transfer the meter data to the distributed ledger VNFs.

The endorser node in the distributed ledger VNFs receives the meter data from the ledger client VNFs. The endorser node executes chain code to perform a test transaction with the meter data to generate a test result. If the test result complies with pre-stored endorsement rules, then the endorser node (or ledger client VNF) transfers the endorsed transaction to a ledger orderer node that distributes the endorsed transaction to ledger peer nodes per a the FGs. In response to the transaction endorsement, the ledger peer nodes execute the chain code to process the meter data to generate a resource-metering response. The ledger peer nodes reach a consensus on the resource-metering response before committing the meter data and resource-metering response to distributed ledger databases in an immutable blockchain format. The ledger client VNFs read the meter data and resource-metering responses from the top data blocks of the distributed ledger VNFs per the FGs. The ledger client VNFs transfer the resource-metering responses to network addresses per the FGs and network address lists.

The wireless data network circuitry described above comprises computer hardware and software that form special-purpose network circuitry that processes meter data for a resource-metering service under distributed ledger control. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry that processes meter data for a resource-metering service under distributed ledger control.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a resource-metering data network under distributed ledger control, the method comprising:
    slice control circuitry directing Management and Orchestration (MANO) circuitry to launch a wireless network slice that comprises a hardware-trust Virtual Network Function (VNF), a ledger-client VNF, and a distributed-ledger VNF;
    the MANO circuitry directing a Network Function Virtualization Infrastructure (NFVI) to instantiate the wireless network slice comprising the hardware-trust VNF, the ledger-client VNF, and the distributed-ledger VNF;
    the NFVI executing the hardware-trust VNF, the ledger-client VNF, and the distributed-ledger VNF;
    the slice control circuitry directing a wireless network computer to provision a wireless User Equipment (UE) with a hardware-trust application, a ledger-client application, a resource metering application, and contact information for the hardware-trust VNF;
    the wireless UE initiating hardware-trust communications with the hardware-trust VNF by using the contact information for the hardware-trust VNF;
    the hardware-trust VNF establishing hardware-trust with the ledger-client VNF, the distributed-ledger VNF, and the wireless UE based on hardware-trust codes that are physically-embedded in read-only memories of the NFVI and the wireless UE;
    the wireless UE executing the hardware trust application, the ledger-client application, and the resource meter application, measuring resource-usage, and wirelessly transferring meter data characterizing the resource-usage for delivery to the ledger-client VNF responsive to the hardware-trust communications and by using the contact information for the ledger-client VNF;
    the ledger-client VNF transferring the meter data to the distributed-ledger VNF; and
    the distributed-ledger VNF executing distributed ledger transactions with the meter data, generating resource-usage results, and committing the meter data and the resource-usage results to different distributed ledgers in a blockchain format comprising data blocks.

2. The method of claim 1 wherein the wireless UE executing the resource metering application, measuring the resource-usage, and transferring the meter data comprises processing circuitry executing an operating system metering kernel that directs the resource-usage measurement and executing an operating system ledger kernel that directs the meter data transfer.

3. The method of claim 1 wherein the hardware-trust VNF establishing hardware-trust with the ledger-client VNF, the distributed-ledger VNF, and the wireless UE based on the hardware-trust codes that are physically-embedded in the read-only memories of the NFVI and the wireless UE comprises:
    the hardware-trust VNF transferring random numbers to the ledger-client VNF, the distributed-ledger VNF, and the wireless UE;
    the ledger-client VNF, the distributed-ledger VNF, and the wireless UE hashing the random numbers with the hardware-trust codes that are physically-embedded in the read-only memories of the NFVI and the wireless UE to generate hardware-trust results and transferring the hardware-trust results to the hardware-trust VNF; and
    the hardware-trust VNF receiving the hardware-trust results, hashing the random numbers with copies of the hardware-trust codes that are physically-embedded in the read-only memories of the NFVI and the wireless UE to generate expected results, and matching the hardware-trust results with the expected results to establish hardware-trust with the ledger-client VNF, the distributed-ledger VNF, and the wireless UE.

4. The method of claim 1 further comprising:
    the ledger-client VNF receiving account activity data and transferring the account activity data to the distributed-ledger VNF; and
    the distributed-ledger VNF receiving the account activity data and executing other distributed ledger transactions with the account activity data to generate user account results and committing the account activity data and the user account results to the different distributed ledgers in the blockchain format.

5. The method of claim 4 wherein the distributed-ledger VNF executing the distributed ledger transactions with the meter data to generate the resource-usage results comprises the distributed-ledger VNF executing the distributed ledger transactions with the meter data and the user account results to generate the resource-usage results.

6. The method of claim 5 wherein the resource-usage results comprise user accounting statements for the resource-usage.

7. The method of claim 1 further comprising the ledger-client VNF reading top data blocks of the different distributed ledgers to receive the resource-usage results and transferring the resource usage results for delivery to network addresses.

8. The method of claim 1 further comprising the distributed-ledger VNF implementing side distributed ledgers in response to executing the distributed ledger transactions with the meter data.

9. A resource-metering data network under distributed ledger control, the resource-metering data network comprising:
    slice control circuitry configured to direct Management and Orchestration (MANO) circuitry to launch a wireless network slice that comprises a hardware-trust Virtual Network Function (VNF), a ledger-client VNF, and a distributed-ledger VNF;
    the MANO circuitry configured to direct a Network Function Virtualization Infrastructure (NFVI) to instantiate the wireless network slice comprising the hardware-trust VNF, the ledger-client VNF, and the distributed-ledger VNF;
    the NFVI configured to responsively execute the hardware-trust VNF, the ledger-client VNF, and the distributed-ledger VNF;
    the slice control circuitry configured to direct a wireless network computer to provision a wireless User Equipment (UE) with a hardware-trust application, a ledger-client application, a resource metering application, and contact information for the hardware-trust VNF;

the wireless UE configured to initiate hardware-trust communications with the hardware-trust VNF by using the contact information for the hardware-trust VNF;

the hardware-trust VNF configured to establish hardware-trust with the ledger-client VNF, the distributed-ledger VNF, and the wireless UE based on hardware-trust codes that are physically-embedded in read-only memories of the NFVI and the wireless UE;

the wireless UE configured to execute the hardware-trust application, the ledger-client application, and the resource meter application, measure resource-usage, and wirelessly transfer meter data characterizing the resource-usage for delivery to the ledger-client VNF responsive to the hardware-trust communications and by using the contact information for the ledger-client VNF;

the ledger-client VNF configured to transfer the meter data to the distributed-ledger VNF; and the distributed-ledger VNF configured to:
execute distributed ledger transactions with the meter data;
generate resource-usage results; and
commit the meter data and the resource-usage results to different distributed ledgers in a blockchain format comprising data blocks.

10. The resource-metering data network of claim 9 wherein the wireless UE comprises processing circuitry configured to execute an operating system metering kernel that directs the resource-usage measurement and execute an operating system ledger kernel that directs the meter data transfer.

11. The resource-metering data network of claim 9 wherein:
the hardware-trust VNF is configured to transfer random numbers to the ledger-client VNF, the distributed-ledger VNF, and the wireless UE;
the ledger-client VNF, the distributed-ledger VNF, and the wireless UE are configured to hash the random numbers with the hardware-trust codes that are physically-embedded in the read-only memories of the NFVI and the wireless UE to generate hardware-trust results and transfer the hardware-trust results to the hardware-trust VNF; and
the hardware-trust VNF is configured to receive the hardware-trust results, hash the random numbers with copies of the hardware-trust codes that are physically-embedded in the read-only memories of the NFVI and the wireless UE to generate expected results, and match the hardware-trust results with the expected results to establish hardware-trust with the ledger-client VNF, the distributed-ledger VNF, and the wireless UE.

12. The resource-metering data network of claim 9 further comprising:
the ledger-client VNF configured to receive account activity data and transfer the account activity data to the distributed-ledger VNF; and
the distributed-ledger VNF configured to receive the account activity data and execute other distributed ledger transactions with the account activity data to generate user account results and commit the account activity data and the user account results to the different distributed ledgers in the blockchain format.

13. The resource-metering data network of claim 12 wherein the distributed-ledger VNF is configured to execute the distributed ledger transactions with the meter data and the user account results to generate the resource-usage results.

14. The resource-metering data network of claim 13 wherein the resource-usage results comprise user accounting statements for the resource-usage.

15. The resource-metering data network of claim 9 further comprising the ledger-client VNF configured to read top data blocks of the different distributed ledgers to receive the resource-usage results and transfer the resource-usage results for delivery to network addresses.

16. The resource-metering data network of claim 9 further comprising the distributed-ledger VNF configured to implement side distributed ledgers in response to executing the distributed ledger transactions with the meter data.

17. A wireless communication network to perform advanced metering under distributed ledger control, the wireless communication network comprising:
slice control circuitry configured to direct Management and Orchestration (MANO) circuitry to launch a wireless network slice that comprises a hardware-trust Virtual Network Function (VNF), a ledger-client VNF, and a distributed-ledger VNF;
the MANO circuitry configured to direct a Network Function Virtualization Infrastructure (NFVI) to instantiate the wireless network slice comprising the hardware-trust VNF, the ledger-client VNF, and the distributed-ledger VNF;
the NFVI configured to responsively execute the hardware-trust VNF, the ledger-client VNF, and the distributed-ledger VNF;
the slice control circuitry configured to direct a Network Exposure Function (NEF) to provision a wireless User Equipment (UE) with a hardware-trust application, a ledger-client application, and a resource metering application;
the hardware-trust VNF configured to establish hardware-trust with the ledger-client VNF, the distributed-ledger VNF, and the wireless UE based on hardware-trust codes that are physically-embedded in read-only memories of the NFVI and the wireless UE;
the wireless UE configured to execute the hardware-trust application, the ledger-client application, and the resource metering application, measure resource-usage, and wirelessly transfer meter data characterizing the resource-usage for delivery to the ledger-client VNF;
the ledger-client VNF configured to transfer the meter data to the distributed-ledger VNF; and
the distributed-ledger VNF configured to execute distributed ledger transactions with the meter data, generate resource-usage results, and commit the meter data and the resource-usage results to different distributed ledgers in an immutable blockchain format.

18. The wireless communication network of claim 17 the wherein the wireless UE comprises processing circuitry configured to execute an operating system metering kernel that directs the resource-usage measurement and execute an operating system ledger kernel that directs the meter data transfer.

19. The wireless communication network of claim 17 wherein:
the hardware-trust VNF is configured to transfer random numbers to the ledger-client VNF, the distributed-ledger VNF, and the wireless UE;
the ledger-client VNF, the distributed-ledger VNF, and the wireless UE are configured to hash the random numbers with the hardware-trust codes that are physically-embedded in the read-only memories of the NFVI and the wireless UE to generate hardware-trust results and transfer the hardware-trust results to the hardware-trust VNF; and the hardware-trust VNF is configured to receive the hardware-trust results, hash the random numbers with copies of the hardware-trust codes that are physically-embedded in the read-only memories of the NFVI and the wireless UE to generate expected results, and match the hardware-trust results with the expected results to establish hardware-trust with the ledger-client VNF, the distributed-ledger VNF, and the wireless UE.

20. The wireless communication network of claim 17 further comprising:

the ledger-client VNF configured to receive account activity data and transfer the account activity data to the distributed-ledger VNF; and the distributed-ledger VNF configured to receive the account activity data and execute other distributed ledger transactions with the account activity data to generate user account results and commit the account activity data and the user account results to the different distributed ledgers in the blockchain format.

* * * * *